United States Patent
Zhang (10) Patent No.: US 9,264,957 B2
(45) Date of Patent: Feb. 16, 2016

(54) KEY DERIVATION DURING INTER-NETWORK HANDOVER

(75) Inventor: Daijiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 13/696,983

(22) PCT Filed: May 10, 2010

(86) PCT No.: PCT/CN2010/072551
§ 371 (c)(1),
(2), (4) Date: Jan. 11, 2013

(87) PCT Pub. No.: WO2011/140695
PCT Pub. Date: Nov. 14, 2011

(65) Prior Publication Data
US 2014/0146786 A1    May 29, 2014

(51) Int. Cl.
*H04W 36/14* (2009.01)
*H04L 29/06* (2006.01)
*H04W 12/04* (2009.01)
*H04W 36/00* (2009.01)

(52) U.S. Cl.
CPC ............. *H04W 36/14* (2013.01); *H04L 63/06* (2013.01); *H04W 12/04* (2013.01); *H04L 2463/061* (2013.01); *H04W 36/0022* (2013.01); *H04W 36/0038* (2013.01)

(58) Field of Classification Search
CPC ..... H04W 12/04; H04W 12/06; H04W 12/08; H04W 36/14
USPC ................... 370/328, 329, 330, 331; 455/411
See application file for complete search history.

(56) References Cited

U.S. PATENT DOCUMENTS

| 2004/0039910 A1* | 2/2004 | Isokangas et al. ............ 713/171 |
| 2008/0089291 A1* | 4/2008 | Song et al. .................... 370/331 |
| 2009/0041247 A1* | 2/2009 | Barany et al. ................ 380/270 |
| 2009/0067623 A1 | 3/2009 | Lei et al. |
| 2009/0271623 A1 | 10/2009 | Forsberg et al. |
| 2009/0307496 A1 | 12/2009 | Hahn et al. |

FOREIGN PATENT DOCUMENTS

| CN | 101336554 A | 12/2008 |
| WO | WO-2007077483 A3 | 10/2007 |
| WO | WO-2010/047367 A1 | 4/2010 |

OTHER PUBLICATIONS

International Search Report dated Feb. 10, 2011, for PCT application No. PCT/CN2010/072551.

(Continued)

*Primary Examiner* — Jamal Javaid
(74) *Attorney, Agent, or Firm* — Mintz Levin Cohn Ferris Glovsky and Popeo, P.C.

(57) ABSTRACT

A method for deriving a key during an inter-network handover is provided. The method comprises: obtaining first key information from a first relocation request message, in response to receipt of said first relocation request message which reaches a target network entity first; deriving a key for handover based at least in part on said first key information; and generating an indicator for indicating that the key is derived based at least in part on said first key information.

24 Claims, 4 Drawing Sheets

(56) References Cited

OTHER PUBLICATIONS

"3RD Generation Partnership Project: Technical Specification Group Services and System Aspects; General Packet Radio Service (GPRS) enhancements for Evolved Universal Terrestrial Radio Access Network (E-UTRAN) access (Release 9)" 3GPP Standard; 3GPP TS 23.401, 3RD Generation Partnership Project (3GPP), Mobile Competence Centre. 650, Route Des Lucioles; F-06921 Sophia-Antipolis Cedex, France. No. V9.4.0, Mar. 25, 2010. pp. 1-258.

"3RD Generation Partnership Project: Technical Specification Group Services and System Aspects; Feasibility Study of Single Radio Voice Call Continuity (SRVCC) from UTRAN/GERAN to E-UTRAN/HSPA; Stage 2(Release 10)", 3GPP TR DRAFT; 23.885-020_rsrxcc_clean, 3rd Competence Centre; 650, Route Des Lucioles; F-06921 Sophia-Antipolis Cedex, France. vol. SA WG2, No. Kyoto; 20100510; May 4, 2010.

"3RD Generation Partnership Project; Technical Specification Group Services and System Aspects; 3GPP System Architecture Evolution (SAE); Security architecture (Release 9)". 3GPP TS 33.401 V9.3.1 (Apr. 2010). 650 Route des Lucioles—Sophia Antipolis Valbonne—France. Apr. 2010.

"3RD Generation Partnership Project; Technical Specification Group Services and System Aspects; IP Multimedia Subsystem (IMS) centralized services; Stage 2 (Release 9)". 3GPP TS 23.292 V9.5.0 (Mar. 2010). 650 Route des Lucioles—Sophia Antipolis Valbonne—France. Mar. 2010.

"3RD Generation Partnership Project; Technical Specification Group Services and System Aspects; IP Multimedia Subsystem (IMS) Service Continuity; Stage 2 (Release 10)". 3GPP TS 23.237 V10.1.0 (Mar. 2010). 650 Route des Lucioles—Sophia Antipolis Valbonne—France. Mar. 2010.

\* cited by examiner

KEY DERIVATION DURING INTER-NETWORK HANDOVER

RELATED APPLICATIONS

This application is a national stage application, filed under 35 U.S.C. §371, of PCT Application No. PCT/CN2010/072551, filed on May 10, 2010, the contents of which is incorporated herein by reference in its entirety.

FIELD OF THE INVENTION

The present invention generally relates to communication networks. More specifically, the invention relates to the key derivation during an inter-network handover.

BACKGROUND

The modern communications era has brought about a tremendous expansion of communication networks. Wireless and mobile networking technologies have addressed related consumer demands, while providing more flexibility and immediacy of information transfer. Radio communication systems, such as Universal Terrestrial Radio Access Network (UTRAN), Evolved UTRAN (E-UTRAN), Global System for Mobile Communication (GSM)/Enhanced Data Rate for GSM Evolution (EDGE) Radio Access Network (GERAN), High-Speed Packet Access (HSPA) network and etc, provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves the key derivation to ensure security, continuity and efficiency of services, especially during a handover between networks with different bearer supports.

SUMMARY

According to a first aspect of the present invention, there is provided a method comprising: obtaining first key information from a first relocation request message, in response to receipt of said first relocation request message which reaches a target network entity first; deriving a key for handover based at least in part on said first key information; and generating an indicator for indicating that the key is derived based at least in part on said first key information.

According further to the first aspect of the present invention, the method may further comprise transmitting the indicator to a source network entity initiating relocation via a first path. Said transmitting the indicator to the source network entity via said first path may comprise: sending a first handover request message comprising the indicator to a target network node; and forwarding a first transparent container containing the indicator to the source network entity, wherein said first transparent container is received from the target network node in a first handover acknowledge message which is a response to said first handover request message. In an embodiment, the source network entity may send the indicator received via said first path to a user equipment (UE) in a first handover command.

According further to the first aspect of the present invention, the method may further comprise: retrieving the indicator, in response to receipt of a second relocation request message comprising second key information; and transmitting the indicator to a source network entity initiating relocation via a second path. Said transmitting the indicator to the source network entity via said second path may comprise: sending a second handover request message comprising the indicator to a target network node; and forwarding a second transparent container containing the indicator to the source network entity, wherein said second transparent container is received from the target network node in a second handover acknowledge message which is a response to said second handover request message. In an embodiment, the source network entity may send the indicator received via said second path to the UE in a second handover command.

According to a second aspect of the present invention, there is provided a network entity comprising: obtaining means for obtaining first key information from a first relocation request message, in response to receipt of said first relocation request message which reaches the network entity first; deriving means for deriving a key for handover based at least in part on said first key information; and generating means for generating an indicator for indicating that the key is derived based at least in part on said first key information.

According further to the second aspect of the present invention, the network entity may further comprise: transmitting means for transmitting the indicator to a source network entity initiating relocation via a first path. Said transmitting the indicator to the source network entity via said first path may comprise: sending a first handover request message comprising the indicator to a target network node; and forwarding a first transparent container containing the indicator to the source network entity, wherein said first transparent container is received from the target network node in a first handover acknowledge message which is a response to said first handover request message. In an embodiment, the source network entity may send the indicator received via said first path to a UE in a first handover command.

According further to the second aspect of the present invention, the network entity may further comprise: retrieving means for retrieving the indicator, in response to receipt of a second relocation request message comprising second key information; and transmitting means for transmitting the indicator to a source network entity initiating relocation via a second path. Said transmitting the indicator to the source network entity via said second path may comprise: sending a second handover request message comprising the indicator to a target network node; and forwarding a second transparent container containing the indicator to the source network entity, wherein said second transparent container is received from the target network node in a second handover acknowledge message which is a response to said second handover request message. In an embodiment, the source network entity may send the indicator received via said second path to the user equipment in a second handover command.

According further to the first and the second aspects of the present invention, said first key information may comprise a cipher key for circuit switched bearer and an integrity key for circuit switched bearer, and said second key information may comprise a cipher key for packet switched bearer and an integrity key for packet switched bearer. Accordingly, said first path may comprise a path for circuit switched relocation, and said second path may comprise a path for packet switched relocation. Alternatively, said first key information may comprise a cipher key for packet switched bearer and an integrity key for packet switched bearer, and said second key information may comprise a cipher key for circuit switched bearer and an integrity key for circuit switched bearer. Accordingly, said first path may comprise a path for packet switched relocation, and said second path may comprise a path for circuit switched relocation.

According to a third aspect of the present invention, there is provided a method comprising: obtaining an indicator from a first handover command message, in response to receipt of said first handover command message which reaches a user equipment first; deriving a key for handover based at least in part on key information indicated by the indicator; and performing a first handover procedure with the key, wherein a relocation request message comprising the key information is the one which first reaches a network entity generating the indicator. The method in the third aspect of the present invention may further comprise performing a second handover procedure with the key, in response to receipt of a second handover command message.

According to a fourth aspect of the present invention, there is provided a user equipment comprising: obtaining means for obtaining an indicator from a first handover command message, in response to receipt of said first handover command message which reaches the user equipment first; deriving means for deriving a key for handover based at least in part on key information indicated by the indicator; and performing means for performing a first handover procedure with the key, wherein a relocation request message comprising the key information is the one which first reaches a network entity generating the indicator. In an embodiment, said performing means may be further adapted to perform a second handover procedure with the key, in response to receipt of a second handover command message.

According further to the third and the fourth aspects of the present invention, the key information may comprise one of the following: a cipher key for packet switched bearer and an integrity key for packet switched bearer; and a cipher key for circuit switched bearer and an integrity key for circuit switched bearer.

According to a fifth aspect of the present invention, there is provided a computer program product comprising a program for a processing device, comprising software code portions for performing the methods in the first aspect of the present invention, when the program is run on the processing device. The software code portions may cause the processing device to perform the following operations: obtaining first key information from a first relocation request message, in response to receipt of said first relocation request message which reaches a target network entity first; deriving a key for handover based at least in part on said first key information; and generating an indicator for indicating that the key is derived based at least in part on said first key information.

According to a sixth aspect of the present invention, there is provided a computer program product comprising a program for a processing device, comprising software code portions for performing the method in the third aspect of the present invention, when the program is run on the processing device. The software code portions may cause the processing device to perform the following operations: obtaining an indicator from a first handover command message, in response to receipt of said first handover command message which reaches a user equipment first; deriving a key for handover based at least in part on key information indicated by the indicator; and performing a first handover procedure with the key, wherein a relocation request message comprising the key information is the one which first reaches a network entity generating the indicator.

In exemplary embodiments of the present invention, the provided methods, network entity, user equipment and computer program product can efficiently derive keys for handover in case of convergence of different bearers, and instruct a UE to derive keys for handover even a handover command is lost on one of transmission paths, thereby shortening the handover time which is important for the time-sensitive traffic like a voice call.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

With evaluation of radio communication networks, a user may encounter one or more inter-network handovers when traveling from one area to another. When a UE tries to hand over from a source network to a target network, there is a need to derive one or more keys during mapping of security contexts between the source network and the target network. However, during a handover procedure, different bearers which provide key information or input parameters in respective relocation messages may be converged. Thus there is a need to decide how to derive a key when there are various input parameters coming from different bearers. This process of key derivation may incur a traffic delay and even discontinuity of data transmissions if a relocation or handover message for one of these bearers is lost.

For example, in a SRVCC handover from UTRAN/GERAN to Long Term Evolution (LTE)/HSPA, there may be convergence of a Circuit Switched (CS) bearer and a Packet Switched (PS) bearer. So it is needed to decide how to derive a $K'_{ASME}$ in EUTRAN or CK∥IK in HSPA when there are both CKcs∥IKcs and CKps∥IKps coming from UTRAN/GERAN, where $K'_{ASME}$ is a 256-bit value, CK refers to a cipher key, IK refers to an integrity key, CKcs refers to CK for CS bear, IKcs refers to IK for CS bear, CKps refers to CK for PS bear, IKps refers to IK for PS bear, CK∥IK refers to concatenation of CK and IK, CKcs∥IKcs refers to concatenation of CKcs and IKcs, and CKps∥IKps refers to concatenation of CKps and IKps. In addition, since there may be both PS relocation and CS relocation, and these different relocation requests go through a source Serving General Packet Radio Service Support Node (SGSN) and a Mobile Switching Center (MSC) server enhanced for SRVCC separately, they may not reach a target Mobility Management Entity (MME) at the same time or even be lost on one path.

It is desirable to design a scheme to speed up the handover which is important for the time-sensitive traffic such as a voice/CS call, which scheme can enable a target network entity to derive keys for handover based on which relocation request reaches the target network entity first, and indicate a UE to derive keys for handover with the same criterion.

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Figure 1:
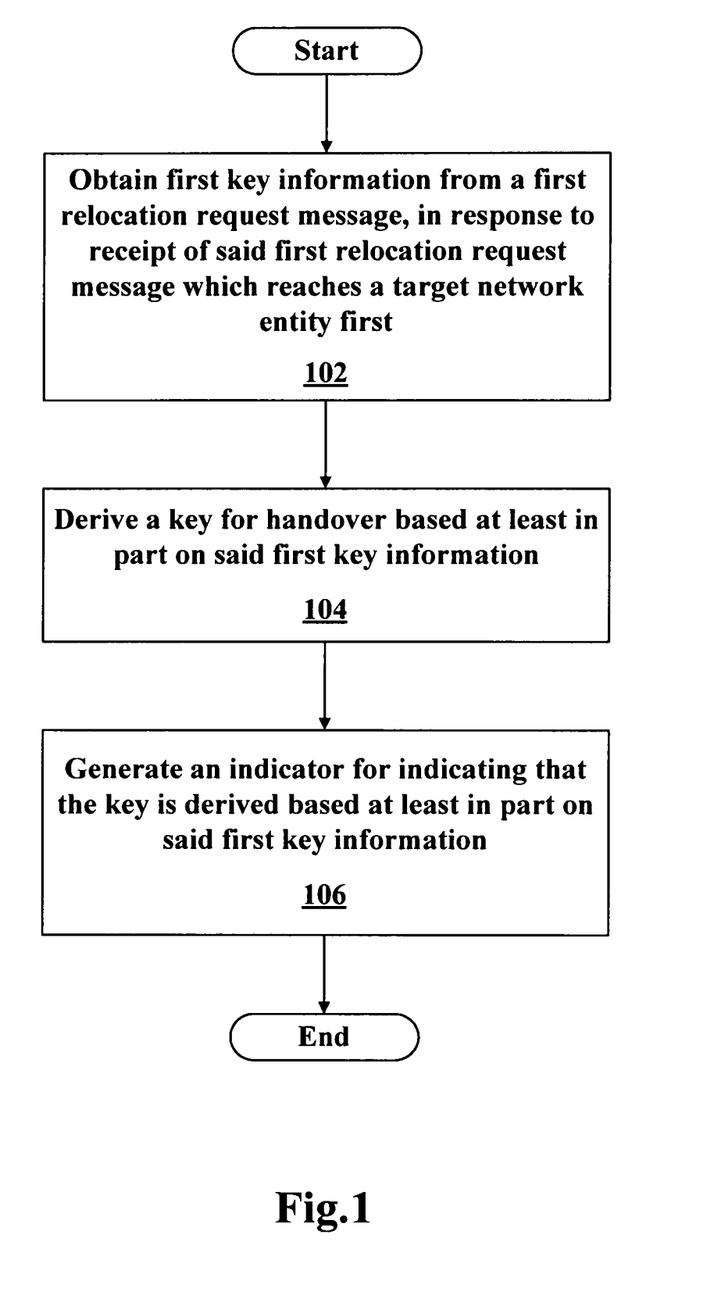
FIG. 1 is a flowchart illustrating a method for deriving a key for handover at a network entity in accordance with embodiments of the present invention.

FIG. 1 is a flowchart illustrating a method for deriving a key for handover at a network entity in accordance with embodiments of the present invention. Since during an inter-network handover procedure, different bearers such as CS bearer and PS bearer may be converged at a target network entity (for example a target MME for an EUTRAN system, and a target SGSN for a HSPA network), it is advantageous that the target network entity is able to decide how to derive keys for handover when different bearer relocation requests carrying respective key information and/or input parameters arrive. Specifically, a network entity needs to derive keys for handover without introducing extra latency, especially when relocation request messages may reach the network entity at different time due to different communication paths or even be lost on one path.

In this regard, a target network entity may derive a key for handover (for example, $K'_{ASME}$ in a SRVCC handover from UTRAN to E-UTRAN, or CK||IK in a SRVCC handover from UTRAN to HSPA) based on which relocation request reaches the target network entity first. According to an exemplary embodiment, a target network entity may obtain first key information from a first relocation request message in step 102, in response to receipt of said first relocation request message which reaches the target network entity first. In other words, said first relocation request message arrives at the target network entity earlier than other relocation request messages which comprise a second relocation request message comprising second key information.

According to an exemplary embodiment, if said first relocation request message is for CS relocation and said second relocation request message is for PS relocation, then said first key information may comprise CKcs and IKcs, and said second key information may comprise CKps and IKps. However, if said first relocation request message is for PS relocation and said second relocation request message is for CS relocation, then said first key information may comprise CKps and IKps, and said second key information may comprise CKcs and IKcs.

In step 104, the target network entity derives a key for handover based at least in part on said first key information. For example, for a SRVCC handover from UTRAN to E-UTRAN, a $K'_{ASME}$ can be derived at a target MME based at least in part on CKcs||IKcs or CKps||IKps, which depends on whether said first relocation request message is for CS bear or PS bear, as described above. The derivation of $K'_{ASME}$ is defined in A.10 of 3GPP (3rd Generation Partnership Project) TS33.401, which is not reproduced here. In case of a SRVCC handover from UTRAN to HSPA, it is a target SGSN that derives a key for handover based at least in part on said first key information. It is noted that for the situation of a SRVCC handover from GERAN to E-UTRAN/HSPA, Kc is converted to CK||IK first.

Then in step 106, the target network entity generates an indicator for indicating that the key for handover is derived based at least in part on said first key information. This indicator can be transmitted to a source network entity initiating relocation via a first path and then be forwarded to a UE which needs to hand over from a source network to a target network, so that the UE can derive a key for this handover procedure according to the indicator. The transmission of the indicator from the target network entity (such as a target MME or a target SGSN) to the source network entity (such as a source Radio network subsystem/Base station system (RNS/BSS)) may be implemented by message interactions between network elements.

According to an exemplary embodiment, the target network entity derives the key for handover and generates the corresponding indicator with respect to said first relocation request message (for example, a forward relocation request message from a source SGSN or a MSC Server). Then the target network entity sends a first handover request message comprising the indicator to a target network node such as an evolved Node B (eNode B). As a response to said first handover request message, a first handover acknowledge message comprising a first transparent container is sent from the target network node to the target network entity. Said first transparent container contains the indicator generated by the target network entity. Then, the target network entity forwards said first transparent container to the source network entity.

For example, if said first relocation request message is for CS relocation, then said first path comprises a path for CS relocation. In this case, when the target network entity such as a target MME receives said first handover acknowledge message from the target network node such as eNode B, it may transmit said first transparent container containing the indicator to the source network entity such as a source RNS/BSS through a MSC server and then a source MSC. In response to receiving the indicator via said first path, the source network entity may send the indicator to the UE, for example, in a first handover command. Alternatively, if said first relocation request message is for PS relocation, then said first path comprises a path for PS relocation. Accordingly, the target network entity may forward said first transparent container containing the indicator to the source network entity through a source SGSN.

According to an exemplary embodiment, when receiving said second relocation request message comprising said second key information, the target network entity is not required to derive a key for handover with respect to this bearer relocation again, since it has derived the key and generated a corresponding indicator upon receiving said first relocation request message. Thus the target network entity can retrieve the indicator generated with respect to said first relocation request message, and transmit it to the source network entity initiating relocation via a second path. For example, the target network entity may send a second handover request message comprising the indicator to the target network node, and as a response, the target network node may send back to the target network entity a second handover acknowledge message which comprises a second transparent container containing the indicator. Then, the target network entity can forward said second transparent container to the source network entity.

For example, if said second relocation request message is for PS relocation (which is in contrast to said first relocation request message for CS relocation), said second path comprises a path for PS relocation. In this case, the target network entity such as a target MME may transmit said second transparent container containing the indicator to the source network entity through a source SGSN. However, if said second relocation request message is for CS relocation (which is in contrast to said first relocation request message for PS relocation), said second path comprises a path for CS relocation, and the target network entity may forward said second transparent container to the source network entity through a MSC server and then a source MSC. In response to receiving the indicator via said second path, the source network entity sends the indicator to the UE, for example, in a second handover command.

In an exemplary embodiment, the source network entity, upon receiving the indicator via one of said first path and said second path, may send the received indicator immediately to the UE without waiting any message from the other path. In this way, even a message comprising the indicator is lost on one path the source network entity can still receive the indicator via the other path, and thus indicate the UE to derive a key for this handover procedure. Moreover, since the source network entity such as a source RNS/BSS need not to synchronize messages from different bearer paths and can send a respective handover command immediately to the UE, it is not necessary to change the legacy RNS/BSS.

According to exemplary embodiments, the determination as to whether the received relocation request message is the one which reaches a target network entity first may be made, for example, by checking whether the target network entity has at least one of a key derived for handover and a corresponding indicator. In an exemplary embodiment, if there is no key for handover, the received relocation request message is the one which reaches the target network entity first, and thus the target network entity generates a key for handover and a corresponding indicator as described in step 102 to step 106. Otherwise, the received relocation request message is a subsequent relocation request message, and thus the target network entity may directly utilize the generated indicator to continue the handover procedure.

Figure 2:
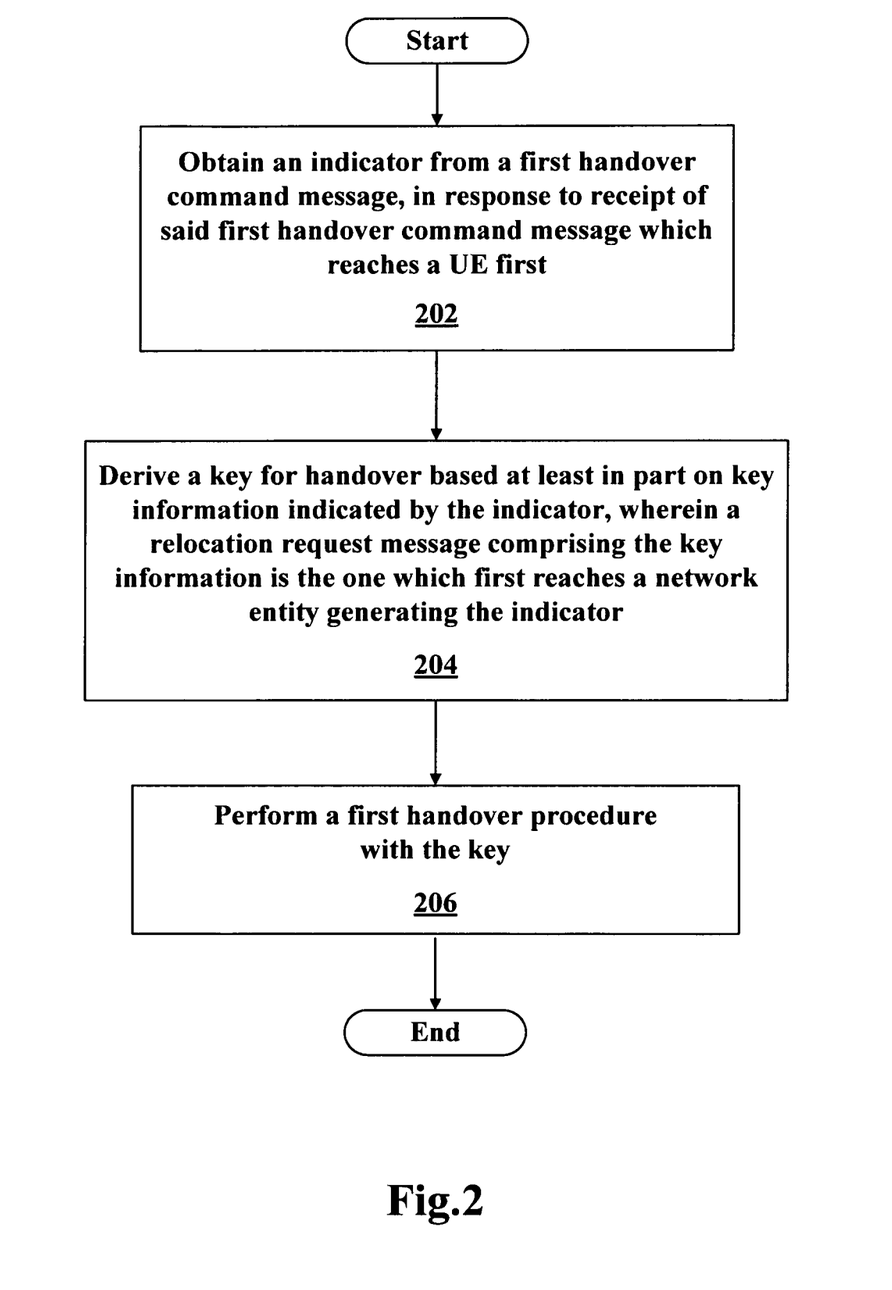
FIG. 2 is a flowchart illustrating a method for deriving a key for handover at a user equipment (UE) in accordance with embodiments of the present invention.

Reference is now made to FIG. 2 which is a flowchart illustrating a method for deriving a key for handover at a UE in accordance with embodiments of the present invention. In step 202, the UE may obtain an indicator from a first handover command message, in response to receipt of said first handover command message which reaches the UE first. In other words, said first handover command message arrives at the UE earlier than other handover command messages which comprise a second handover command message. In step 204, the UE derives a key for handover based at least in part on key information indicated by the indicator. The key information may comprise one of the following: CKps and IKps; and CKcs and IKcs. According to exemplary embodiments, a relocation request message comprising the key information indicated by the indicator is the one which first reaches a network entity generating the indicator. In other words, the relocation request message comprising the indicated key information arrives at the network entity earlier than other relocation request messages comprising respective key information. For example, the network entity may comprise a target MME for the E-UTRAN system and a target SGSN for the HSPA network. Then in step 206, the UE may perform a first handover procedure with the key. According to an exemplary embodiment, in response to receipt of a second handover command message, the UE may perform a second handover procedure with the key which has been derived with respect to said first handover command message, without generating again a key for handover.

For example, if the indicator indicates the UE to derive a key for handover based at least in part on CKps and IKps, it means that a PS relocation request message first reaches the network entity generating the indicator. The network entity such as a target MME or a target SGSN also derives a key for handover based at least in part on CKps and IKps, and generates this indicator accordingly. The indicator may be received by the UE respectively in said first and second handover command messages through a source network entity such as a source RNS/BSS. In this way, even a handover command message on one path is lost the UE may still derive the key for the other path.

The solution provided by the present invention enables a network entity (such as a target MME or a target SGSN), a target node (such as eNode B), a source network entity (such as a source RNS/BSS), and a UE (such as a mobile terminal) to transmit messages for different bearers respectively, without synchronizing messages from different bearer paths. This shortens the handover time which is important to the time-sensitive traffic such as a CS call. Moreover, such solution can enhance the system robustness since a UE may derive a key for handover according to an indicator from any one of handover command messages sent by a source network entity.

Figure 3:
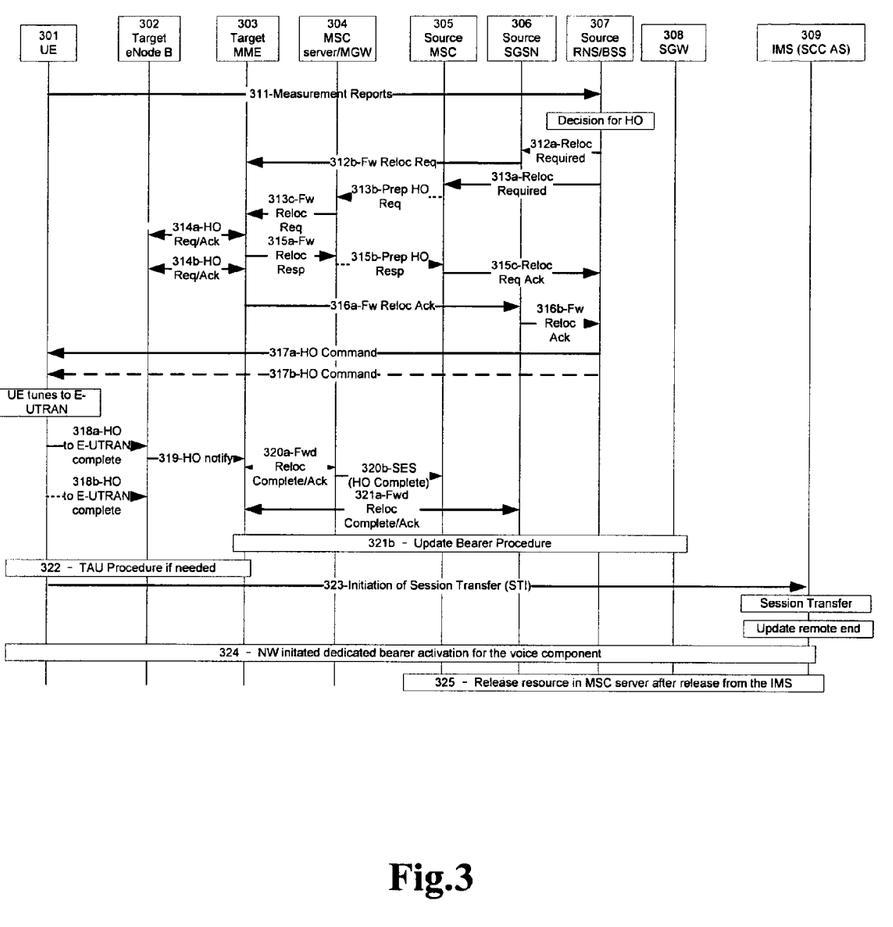
FIG. 3 shows schematically a call flow for a Single Radio Voice Call Continuity (SRVCC) handover from UTRAN or GERAN with Packet Switched (PS) handover support to E-UTRAN.

FIG. 3 shows schematically a call flow for a SRVCC handover from UTRAN or GERAN with PS handover support to E-UTRAN in accordance with an embodiment of the present invention. This handover procedure comprises the handling of the non-voice component. E-UTRAN neighboring cells may be configured in UTRAN/GERAN for the purpose of measurements. As shown in FIG. 3, based on UE measurement reports 311 from a UE 301, a Source RNS/BSS 307 decides to trigger a handover to E-UTRAN.

When the Source RNS/BSS 307 makes a decision for handover (HO), it initiates PS relocation and sends a Relocation Required (Source to Target Transparent Container) message 312a to a source SGSN 306. Then the Source SGSN 306 sends to a target MME 303 a Forward Relocation Request message 312b comprising CKps and IKps for deriving a $K'_{ASME}$ at the target MME 303. The Forward Relocation Request message 312b also comprises information about the non-voice component only. In parallel to the initiation of PS relocation, the source RNS/BSS 307 initiates CS relocation by sending a Relocation Required (Source to Target Transparent Container) message 313a to a source MSC 305. Then the Source MSC 305 sends a Prepare HO Request 313b to a MSC Server 304 which in turn sends a Forward Relocation Request (Source to Target Transparent Container) message 313c to the target MME 303. The Forward Relocation Request (Source to Target Transparent Container) message 313c comprises CKcs and IKcs for deriving a $K'_{ASME}$ at the target MME 303.

The target MME 303 responds to the two Forward Relocation Request messages 312b and 313c separately based on which one arrives first, as described with respect to FIG. 1. In an exemplary embodiment, when a Forward Relocation Request message reaches the target MME 303, the target MME 303 may check if there is already a $K'_{ASME}$ derived for the UE 301. If there is no $K'_{ASME}$, then this Forward Relocation Request message is the one which arrives at the target MME 303 first. Thus the target MME 303 derives a $K'_{ASME}$ based at least in part on CK and IK from this Forward Relocation Request message (for example, CKps and IKps for the Forward Relocation Request message 312b, and CKcs and IKcs for the Forward Relocation Request message 313c), and generates an indicator indicating whether the $K'_{ASME}$ is derived based at least in part on CKps and IKps or on CKcs and IKcs. Then the target MME 303 sends to a target eNodeB 302 a first HO request message containing the indicator. However, if there is already a $K'_{ASME}$, then this Forward Relocation Request message is not the one which arrives at the target MME 303 first. Thus the target MME 303 utilizes the generated indicator directly and then sends a second HO request message comprising this indicator to the target eNodeB 302.

For example, if the CS relocation request 313c reaches first, the target MME 303 may derive the $K'_{ASME}$ from CKcs and IKcs. In an embodiment, a $NONCE_{MME}$ may also be used in the key derivation. A corresponding indicator is generated by the target MME 303 to indicate the UE 301 to derive a $K'_{ASME}$ from CKcs and IKcs. Then the target MME 303 sends to the target eNodeB 302 a HO request 314a which contains the indicator (and the $NONCE_{MME}$ if needed). When receiving the PS relocation request 312b which reaches the target MME 303 later than the CS relocation request 313c, the target MME 303 may utilize the generated indicator directly, and comprise the indicator (and the $NONCE_{MME}$ if needed) into a HO request 314b which is sent to the target eNodeB 302. Alternatively, if the PS relocation request 312b reaches earlier than the CS relocation request 313c, the target MME 303 may derive the $K'_{ASME}$ from CKps and IKps (and the $NONCE_{MME}$ if needed), and generate a corresponding indicator for indicating that the $K'_{ASME}$ is derived from CKps and IKps. Accordingly, the indicator is contained in each of the HO request messages 314a and 314b to be sent to the target eNode B 302. In another embodiment, $NONCE_{MME}$ may also be contained in each HO request message.

According to exemplary embodiments, the target eNode B 302 is not required to synchronize the two handover request messages 314a and 314b from the target MME 303. Instead, the target eNode B 302 may respectively respond to each of handover request messages from the target MME 303, by comprising the received indicator (and the $NONCE_{MME}$ if needed) into a transparent container and sending the transparent container back to the target MME 303 in a respective handover acknowledge message. By exchanging Handover Request/Acknowledge messages with the target E-UTRAN, the target MME 303 requests resource allocation for the non-voice component only. For each handover acknowledge message (in CS or PS) from the target eNode B 302, the target MME 303 acknowledges the corresponding prepared relocation (in CS or PS) towards the source access.

As shown in FIG. 3, when the target MME 303 acknowledges the prepared CS relocation towards the source access, it sends a Forward Relocation Response (Target to Source Transparent Container) message 315a to the MSC Server 304 which in turn sends a Prepare HO Response 315b to the source MSC 305. Then the source MSC 305 sends a Relocation Required Acknowledge (Target to Source Transparent Container) message 315c to the source RNS/BSS 307. The indicator (and the $NONCE_{MME}$ if needed) is contained in these three messages 315a-315c, so that the source RNS/BSS 307 can inform the UE 301 of how to derive a key for handover. Similarly, when the target MME 303 acknowledges the prepared PS relocation towards the source access, it sends a Forward Relocation Response (Target to Source Transparent Container) message 316a to the source SGSN 306. Then the source SGSN 306 sends a Relocation Required Acknowledge (Target to Source Transparent Container) message 316b to the source RNS/BSS 307. The indicator (and the $NONCE_{MME}$ if needed) is also contained in these two messages 316a-316b.

In response to receipt of each of the Relocation Required Acknowledge (Target to Source Transparent Container) messages, the source RNS/BSS 307 sends a respective Handover command from UTRAN Command message to the UE 301 to instruct it to perform a handover to E-UTRAN, comprising the relocation of the voice bearer to the PS domain. The respective Handover command from UTRAN Command message comprises the indicator (and the $NONCE_{MME}$ if needed), so that the UE 301 can derive a $K'_{ASME}$ according to the received indicator. In other words, the source RNS/BSS 307 may send a PS handover command message 317a and a CS handover command message 317b to the UE 301 separately, without synchronizing the two Relocation Required Acknowledge (Target to Source Transparent Container) messages 315c and 316b.

Similar to the target MME 303, the UE 301 may derive a $K'_{ASME}$ from CKcs||IKcs or CKps||IKps according to the received indicator, upon receiving a handover command message which arrives first. Then the UE 301 re-tunes to E-UTRAN radio and sends a first Handover to E-UTRAN Complete message to the E-UTRAN. In response to the receipt of another handover command message, the UE 301 may not derive the $K'_{ASME}$ again, but directly sends a second Handover to E-UTRAN Complete message to the E-UTRAN. In other words, the UE 301 may sends a PS handover command message 318a and a CS handover command message 318b to the E-UTRAN separately, without synchronizing the two handover command messages 317a and 317b.

Then the target E-UTRAN synchronizes the two Handover to E-UTRAN Complete messages 318a and 318b, and informs the target MME 303 by sending a Handover Notify message 319. The target MME 303 thus completes CS and PS relocations. When the target MME 303 completes the CS relocation, it sends a Forward Relocation Complete message to the MSC Server 304. The MSC Server 304 acknowledges the information by sending a Forward Relocation Complete Acknowledge message to the target MME 303. Then the MSC Server 304 sends a Handover Complete message 320b to the source MSC 305. When the target MME 303 completes the PS relocation in parallel, it exchanges Forward Relocation Complete/Acknowledge messages 321a with the source SGSN 306. The target MME 303 performs the Update bearer procedure 321b with a Serving gateway (SGW) 308 and a Packet data network (PDN) GW. At this point the relocation of all non-voice PS bearers is completed and the user data are flowing across E-UTRAN access in both directions.

In an exemplary embodiment, the UE 301 performs a Tracking Area Update (TAU) procedure 322 if required (e.g. due to UE mobility under CS coverage). Subsequently, the UE 301 initiates the Session Transfer procedure 323, for example, by sending a Session Initiation Protocol (SIP) INVITE (STI) message to a Service Centralization and Continuity Application Server (SCC AS) 309. Standard Internet Protocol (IP) multimedia subsystem (IMS) Service Continuity procedures are applied for execution of the Session Transfer (see 3GPP TS 23.292 [3] and TS 23.237 [4]). As part of this procedure, the remote end is updated with the Session Description Protocol (SDP) of the IMS access leg. The downlink flow of VoIP (Voice over IP) packets is switched towards the Package Data Network Gateway (PDN GW) at this point. This step can occur in parallel with step 322. Then the IMS triggers 324 a network-initiated dedicated bearer for the voice component, and releases 325 the CS access leg which result in release of resources in the MSC Server.

An advantage of the above solution is that the source RNS is not required to synchronize the two Relocation Required Acknowledge messages, but can send the Handover command immediately to the UE. This shortens the handover time which is important to a CS call. Moreover, it is not necessary to make change to the legacy RNS. In addition, even one of the handover command messages is lost on one path, the UE is still able to derive the K'$_{ASME}$ for the other path. The process of key derivation in accordance with embodiments of the present invention also can be applied in a SRVCC handover from UTRAN to HSPA, except that it is a target SGSN rather than a target MME that decides whether to use CKps||IKps or CKcs||IKcs and notifies a UE by sending a corresponding indicator. For a SRVCC handover from GERAN to ETRAN/HSPA, Kc may be converted to CK||IK first.

The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 4:
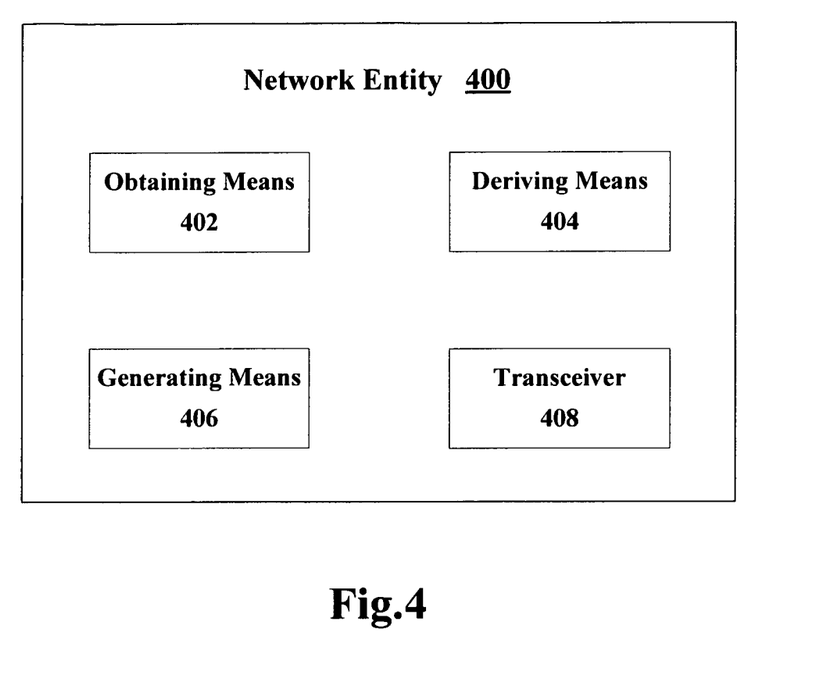
FIG. 4 is a block diagram of a network entity in accordance with embodiments of the present invention.

FIG. 4 is a block diagram of a network entity 400 in accordance with embodiments of the present invention. The network entity 400, such as a target MME, a target SGSN or the like, may comprise various means and/or components for implementing functions of the foregoing steps and methods in FIG. 1. Particularly, the network entity 400 comprises obtaining means 402, deriving means 404 and generating means 406, as shown in FIG. 4. The obtaining means 402, the deriving means 404 and the generating means 406 may be coupled to each other by a variety of communication links and/or interfaces. Alternatively, the network entity 400 also may comprise a transceiver 408 for transmitting and/or receiving signals and messages, or comprises separate transmitting means and receiving means (not shown) for separately transmitting and receiving signals/messages. Optionally, the network entity 400 may further comprise a processor (not shown) for processing these signals and messages.

In response to receipt of a first relocation request message which reaches the network entity 400 first, the obtaining means 402 may obtain first key information from said first relocation request message, according to an exemplary embodiment. In other words, said first relocation request message is the one which arrives at the network entity 400 first, among all relocation request messages. Based at least in part on said first key information, the deriving means 404 may derive a key for handover. Accordingly, the generating means 406 may generate an indicator for indicating that the key is derived based at least in part on said first key information. According to exemplary embodiments, the transmitting means such as the transceiver 408 of the network entity 400 may transmit the generated indicator to a source network entity initiating relocation via a first path.

For the transmission of the indicator to the source network entity such as a source RNS/BSS, the network entity 400 sends a first handover request message comprising the indicator to a target network node such as an eNode B, for example, by the transceiver 408 of the network entity 400. When receiving a first handover acknowledge message comprising a first transparent container from the target network node, the network entity 400 may forward said first transparent container containing the indicator to the source network entity. Then the source network entity may send the indicator received via said first path to a UE in a first handover command, so as to instruct the UE (such as UE 500 in FIG. 5) to derive a key for handover according to the indicator.

According to exemplary embodiments, the network entity 400 may further comprise retrieving means for retrieving the indicator, in response to receipt of a second relocation request message comprising second key information, and transmitting means for transmitting the indicator to a source network entity initiating relocation via a second path. The retrieving means is not shown in FIG. 4. It will be appreciated that the transmitting means for transmitting the indicator to the source network entity via said first path and the transmitting means for transmitting the indicator to the source network entity via said second path, may be a single device or separate devices, and may be implemented by the transceiver 408.

Similar to the process of transmitting the indicator to the source network entity via said first path, when the network entity 400 transmits the indicator to the source network entity via said second path, a second handover request message comprising the indicator is sent from the network entity 400 to a target network node such as an eNode B. As a response, a second handover acknowledge message comprising a second transparent container is sent by the target network node back to the network entity 400. Then the network entity 400 may forward said second transparent container which contains the indicator to the source network entity, so that the source network entity may send the indicator received via said second path to the UE in a second handover command. In an exemplary embodiment, transmission of the indicator to the source network entity and then to the UE may also comprise delivery of some input parameters like NONCE$_{MME}$ for key derivation.

As described with respect to FIG. 1, according to exemplary embodiments, if said first relocation request message is for CS relocation while said second relocation request message is for PS relocation, then said first key information may comprise CKcs and IKcs, said second key information may comprise CKps and IKps, and accordingly said first path comprise a path for CS relocation, and said second path comprises a path for PS relocation. Alternatively, if said first relocation request message is for PS relocation while said second relocation request message is for CS relocation, then said first key information may comprise CKps and IKps, said second key information may comprise CKcs and IKcs, and accordingly said first path comprise a path for PS relocation, and said second path comprises a path for CS relocation.

Figure 5:
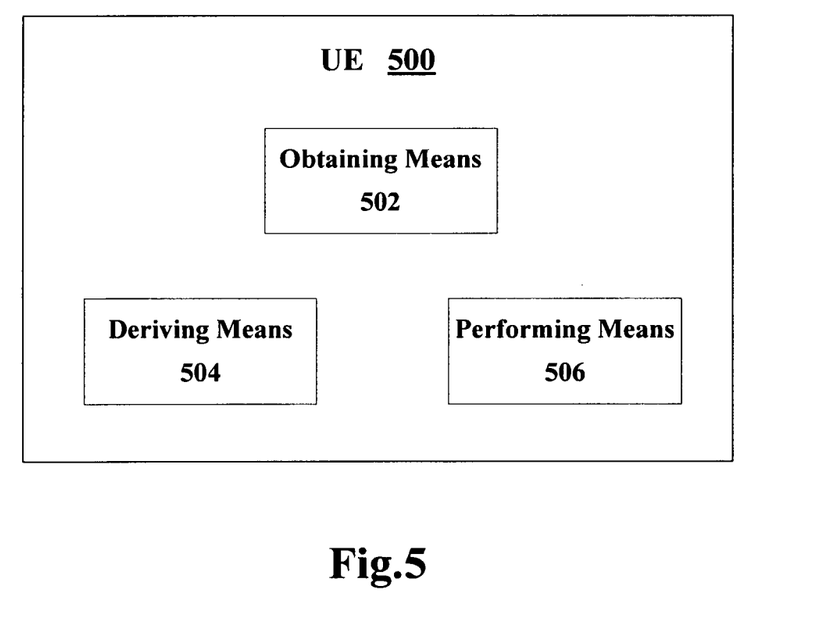
FIG. 5 is a block diagram of a UE in accordance with embodiments of the present invention.

FIG. 5 is a block diagram of a UE 500 in accordance with embodiments of the present invention. The UE 500, such as a mobile terminal, a wireless device, a portable computer or the like, may comprise various means and/or components for implementing functions of the foregoing steps and methods in FIG. 2. Particularly, as shown in FIG. 5, the UE 500 comprises obtaining means 502, deriving means 504, and performing means 506. In addition to these, the UE 500 may comprise normal components and elements, for example, a processor and a transceiver (or separate transmitting means and receiving means) for communicate with a network entity or another UE. These components and elements (not shown) can be connected with each other through one or more communication lines or interfaces.

In response to receipt of a first handover command message which reaches the UE 500 first, the obtaining means 502 may obtain an indicator from said first handover command message, according to an exemplary embodiment. In other words, said first handover command message is the one which arrives at the UE 500 first, among all handover command messages. Based at least in part on key information indicated by the indicator, the deriving means 504 may derive a key for handover. The key information may comprise: CKps and IKps; or CKcs and IKcs. As previously described, a relocation request message comprising the key information is the one which first reaches a network entity (such as network entity 400) generating the indicator. For example, if the relocation request message comprising the indicated key information is for CS relocation, then the key information comprise CKcs and IKcs. However, if the relocation request message comprising the indicated key information is for PS relocation, then the indicated key information comprise CKps and IKps.

With the generated key, the performing means 506 may perform a first handover procedure, for example, re-tuning to a target network and sending a first handover complete message to the target network. The performing means 504 is further adapted to perform a second handover procedure with the key in response to receipt of a second handover command message, for example, sending a second handover complete message to the target network. In an exemplary embodiment, said second handover command message may also comprise the indicator, although the UE 500 has derived the key for handover according to the indicator obtained from said first handover command message. Said first and second handover complete messages, for example, handover complete messages in CS and PS, may be synchronized at the target network which then notifies the network entity (such as the network entity 400) to complete CS and PS relocations. According to exemplary embodiments, the UE 500 may perform a TAU procedure if required, and initiate a session transfer procedure, as illustrated in FIG. 3.

Those skilled in the art will realize that the network entity 400 and the UE 500 may comprise other functional means and/or modules not shown. According to an embodiment of the present invention, the foregoing and additional means and/or modules comprised in the network entity 400 and the UE 500 may be implemented as a software block or a hardware block or a combination thereof. Furthermore, these means and/or modules may be implemented as a separate block or can be combined with any other standard block or it can be split into several blocks according to their functionality.

The present invention may be realized in hardware, software, firmware or a combination thereof. The present invention also may be embodied in a computer program product, which comprises all the features enabling the implementation of the methods and devices or modules described herein, and when being loaded into a computer system or a processing device, is able to carry out these methods or constitute the functional means/modules in the apparatuses or devices according to embodiments of the present invention. For example, a program of the computer program product may be loadable into a memory of the processing device. The computer program product may comprise a computer-readable medium on which software code portions for performing the methods, apparatus, devices and/or modules of the present invention are stored.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method, comprising:
   obtaining, by a network entity, first key information from a first relocation request message, in response to receipt of said first relocation request message which reaches a target network entity first, when compared to a second relocation request message arriving after the first relocation request message, wherein the first relocation request message is associated with a first type of bearer and the second relocation request message is associated with a second type of bearer;
   deriving, by the network entity, a key for handover based at least in part on said first key information; and
   generating, by the network entity, an indicator for indicating that the key is derived based at least in part on said first key information.

2. The method according to claim 1, further comprising:
   transmitting the indicator to a source network entity initiating relocation via a first path.

3. The method according to claim 2, wherein said transmitting the indicator to the source network entity via said first path comprises:
   sending a first handover request message comprising the indicator to a target network node; and
   forwarding a first transparent container containing the indicator to the source network entity, wherein said first transparent container is received from the target network node in a first handover acknowledge message which is a response to said first handover request message.

4. The method according to claim 2, wherein the source network entity sends the indicator received via said first path to a user equipment in a first handover command.

5. The method according to claim 1, further comprising:
   retrieving the indicator, in response to receipt of the second relocation request message comprising second key information; and
   transmitting the indicator to a source network entity initiating relocation via a second path.

6. The method according to claim 5, wherein said transmitting the indicator to the source network entity via said second path comprises:
   sending a second handover request message comprising the indicator to a target network node; and
   forwarding a second transparent container containing the indicator to the source network entity, wherein said second transparent container is received from the target network node in a second handover acknowledge message which is a response to said second handover request message.

7. The method according to claim 5, wherein the source network entity sends the indicator received via said second path to the user equipment in a second handover command.

8. The method according to claim 5, wherein said first key information comprises a cipher key for the first type of bearer comprising a circuit switched bearer and an integrity key for circuit switched bearer, and said second key information comprises a cipher key for the second type of bearer comprising a packet switched bearer and an integrity key for packet switched bearer; and wherein said first path comprises a path for circuit switched relocation, and said second path comprises a path for packet switched relocation.

9. The method according to claim 5, wherein said first key information comprises a cipher key for the first type of bearer comprising a packet switched bearer and an integrity key for packet switched bearer, and said second key information comprises a cipher key for the second type of bearer comprising a circuit switched bearer and an integrity key for circuit switched bearer; and wherein said first path comprises a path for packet switched relocation, and said second path comprises a path for circuit switched relocation.

10. The method of claim 1, wherein the network entity comprises the target network entity.

11. The method of claim 1, wherein the comparison includes the second relocation request message and/or a handover message.

12. The method of claim 1 further comprising:
receiving the first relocation request message, and subsequently receiving the second relocation request message.

13. An apparatus, comprising:
at least one processor; and
at least one memory including computer program code, the at least one memory and the computer program code configured to, with the at least one processor, cause the apparatus to perform at least the following:
obtain first key information from a first relocation request message, in response to receipt of said first relocation request message which reaches the apparatus first, when compared to a second relocation request message arriving after the first request relocation message, wherein the first relocation request message is associated with a first type of bearer and the second relocation request message is associated with a second type of bearer;
derive a key for handover based at least in part on said first key information; and
generate an indicator for indicating that the key is derived based at least in part on said first key information, wherein the apparatus comprises a network entity.

14. The apparatus according to claim 13, wherein the apparatus is further configured to at least transmit the indicator to a source network entity initiating relocation via a first path.

15. The apparatus according to claim 14, wherein the apparatus is further configured to at least:
send a first handover request message comprising the indicator to a target network node; and
forward a first transparent container containing the indicator to the source network entity, wherein said first transparent container is received from the target network node in a first handover acknowledge message which is a response to said first handover request message.

16. The apparatus according to claim 14, wherein the source network entity sends the indicator received via said first path to a user equipment in a first handover command.

17. The apparatus according to claim 13, wherein the apparatus is further configured to at least:
retrieve the indicator, in response to receipt of the second relocation request message comprising second key information; and
transmit the indicator to a source network entity initiating relocation via a second path.

18. The apparatus according to claim 17, wherein the apparatus is further configured to at least:
send a second handover request message comprising the indicator to a target network node; and
forward a second transparent container containing the indicator to the source network entity, wherein said second transparent container is received from the target network node in a second handover acknowledge message which is a response to said second handover request message.

19. The apparatus according to claim 17, wherein the source network entity sends the indicator received via said second path to the user equipment in a second handover command.

20. The apparatus according to claim 17, wherein said first key information comprises a cipher key for the first type of bearer comprising a circuit switched bearer and an integrity key for circuit switched bearer, and said second key information comprises a cipher key for the second type of bearer comprising a packet switched bearer and an integrity key for packet switched bearer; and wherein said first path comprises a path for circuit switched relocation, and said second path comprises a path for packet switched relocation.

21. The apparatus according to claim 17, wherein said first key information comprises a cipher key for the first type of bearer comprising a packet switched bearer and an integrity key for packet switched bearer, and said second key information comprises a cipher key for the second type of bearer comprising a circuit switched bearer and an integrity key for circuit switched bearer; and wherein said first path comprises a path for packet switched relocation, and said second path comprises a path for circuit switched relocation.

22. An apparatus, comprising:
at least one processor; and
at least one memory including computer program code, the at least one memory and the computer program code configured to, with the at least one processor, cause the apparatus to perform at least the following:
obtain an indicator from a first handover command message, in response to receipt of said first handover command message which reaches the apparatus first, when compared to a second handover command message arriving after the first handover command message, wherein the first handover command message is associated with a first type of bearer and the second handover command message is associated with a second type of bearer;
derive a key for handover based at least in part on key information indicated by the indicator; and
perform a first handover procedure with the key.

23. The apparatus according to claim 22, wherein the apparatus is further configured to perform a second handover procedure with the key, in response to receipt of a second handover command message.

24. The apparatus according to claim 22, wherein the key information comprises one of the following:
a cipher key for packet switched bearer and an integrity key for packet switched bearer; and
a cipher key for circuit switched bearer and an integrity key for circuit switched bearer.

* * * * *